(12) United States Patent
Takasaki et al.

(10) Patent No.: US 9,001,501 B2
(45) Date of Patent: Apr. 7, 2015

(54) CARD TRAY AND TRAY CONNECTOR

(71) Applicant: Molex Incorporated, Lisle, IL (US)

(72) Inventors: Masamitsu Takasaki, Yamato (JP); Yuji Naito, Yamato (JP); Mitsuhiro Tomita, Yamato (JP); Naoto Yoshikawa, Yamato (JP)

(73) Assignee: Molex Incorporated, Lisle, IL (US)

( * ) Notice: Subject to any disclaimer, the term of this patent is extended or adjusted under 35 U.S.C. 154(b) by 74 days.

(21) Appl. No.: 13/727,922

(22) Filed: Dec. 27, 2012

(65) Prior Publication Data

US 2014/0016275 A1   Jan. 16, 2014

(30) Foreign Application Priority Data

Dec. 27, 2011   (JP) ................................. 2011-286659

(51) Int. Cl.
| | |
|---|---|
| *H05K 5/00* | (2006.01) |
| *H05K 7/00* | (2006.01) |
| *B65D 1/34* | (2006.01) |
| *G06K 7/00* | (2006.01) |
| *G06K 13/08* | (2006.01) |
| *H01R 13/24* | (2006.01) |
| *H01R 43/24* | (2006.01) |

(52) U.S. Cl.
CPC ................ *B65D 1/34* (2013.01); *G06K 7/0026* (2013.01); *G06K 13/0831* (2013.01); *G06K 13/085* (2013.01); *H01R 13/2442* (2013.01); *H01R 43/24* (2013.01)

(58) Field of Classification Search
USPC ................ 361/679.01, 727, 728; 439/64, 159
See application file for complete search history.

(56) References Cited

U.S. PATENT DOCUMENTS

| 6,224,391 B1* | 5/2001 | Horie et al. ..................... 439/64 |
| 2003/0032317 A1* | 2/2003 | Ooya et al. ..................... 439/159 |

FOREIGN PATENT DOCUMENTS

JP   3145897 U   10/2008

* cited by examiner

*Primary Examiner* — Anthony Haughton
(74) *Attorney, Agent, or Firm* — Timothy M. Morella

(57) ABSTRACT

The Present Disclosure discloses a card tray including a top panel portion facing the opposite face of a card having terminal members on one face, a front panel portion standing erect at the front edge of the top panel portion and facing the front end of the card, and a rear panel portion standing erect at the rear edge of the top panel portion and facing the rear end of the card. The card tray further includes a notch portion formed in the front panel portion so as to expose at least a portion of the front end of the card, and a card holding spring portion disposed near the rear panel portion, biasing the card forward and applying pressure to the front end of the card in a portion other than the notch portion of the front panel portion. The card is grasped longitudinally to expose the entire face of the card on the terminal member side.

7 Claims, 14 Drawing Sheets

US 9,001,501 B2

CARD TRAY AND TRAY CONNECTOR

REFERENCE TO RELATED APPLICATIONS

The Present Disclosure claims priority to Japanese Patent Application No. 2011-286659, entitled "Card Tray And Card Connector," and filed 27 Dec. 2011 with the Japanese Patent Office. The content of this Application is incorporated in its entirety herein.

BACKGROUND OF THE PRESENT DISCLOSURE

The Present Disclosure relates, generally, to a card tray and a card connector, and, more particularly, to a compact, low-profile card tray and card connector able to reliably hold a card without damaging the components inside the card connector.

Electronic devices include card connectors to allow various types of memory cards. As electronic devices become smaller and more compact, so do memory cards and card connectors. It can be difficult for users to grasp these cards and insert them properly into a card connector. In one proposal, a card is set into a card tray, and the card tray is inserted into a card connector. An example is disclosed in Japanese Utility Model Patent No. 3,145,897, the content of which is hereby incorporated herein in its entirety.

FIG. 14 is a perspective view of a conventional card connector. In FIG. 14, housing 811 has a front wall portion 811a, a bottom panel portion 811b, and a pair of side panel portions 811c. This accommodates a card tray 961. The front wall portion 811a and the side panel portions 811c are made of an insulating material, and the bottom panel portion 811b is metallic. An open portion 811d is formed in the center of the bottom panel portion 811b. When the bottom panel portion 811b is secured to a predetermined portion of the surface of a printed circuit board, the connecting terminals disposed on the surface of the printed circuit board are exposed via the open portion 811d. The card tray 961 has a front wall portion 965, a rear wall portion 963, a bottom panel portion 969, and a pair of side panel portions 964. This accommodates a memory card, and is inserted into the housing 811 of the card connector. Also, an open portion 970 is formed in the center of the bottom panel portion 969.

When a memory card is accommodated in the card tray 961, the connecting pads disposed on the backside of the memory card are exposed via the open portion 970. Therefore, when a card tray 961 accommodating a memory card is inserted into the housing 811 of the card connector, the connecting pads of the memory card make contact with the connecting terminals of the printed circuit board exposed via the open portion 811d of the bottom panel portion 811b of the housing 811 and an electrical connection is established.

However, a conventional card connector does not have a mechanism in the card tray 961 for holding a memory card. When the user handles a card tray 961 containing a memory card, the memory card may slip out. Also, because there is a bottom panel portion 969 in the card tray 961, when the card tray 961 is inserted into the card connector, the bottom face of the housing 811 comes into contact with the bottom panel portion 969 in the portion protruding upwards such as the tips of the connecting terminals, and this portion may become damaged.

SUMMARY OF THE PRESENT DISCLOSURE

The purpose of the Present Disclosure is to provide a compact, low-profile card tray and card connector able to reliably hold a card without damaging the components thereinside.

The Present Disclosure includes a card tray including a top panel portion facing the opposite face of a card having terminal members on one face, a front panel portion standing erect at the front edge of the top panel portion and facing the front end of the card, and a rear panel portion standing erect at the rear edge of the top panel portion and facing the rear end of the card. The card tray further includes a notch portion formed in the front panel portion so as to expose at least a portion of the front end of the card, and a card holding spring portion disposed near the rear panel portion, biasing the card forward and applying pressure to the front end of the card in a portion other than the notch portion of the front panel portion. The card is grasped longitudinally to expose the entire face of the card on the terminal member side.

The Present Disclosure also includes a card tray in which the portion other than the notch portion in the front panel portion is between both ends of the top panel portion in the width direction. The Present Disclosure further includes a card tray in which the card holding spring portion includes a cantilevered main portion, an abutting portion connected to the free end of the main portion and abutting the rear end of the card, and a guiding portion connected to the abutting portion and having a round, curved face. The Present Disclosure additionally includes a card tray in which an uneven portion is formed in the abutting portion and a portion other than the notch portion in the front panel portion.

The Present Disclosure also includes a card tray which also includes a side panel portion standing erect at a side edge of the top panel portion and facing a side edge of the card. Here, the height dimension of the front panel portion and side panel portion is smaller than the thickness dimension of the card.

The Present Disclosure further includes a card connector including a housing accommodating the card tray, a connecting terminal mounted in the housing and contacting a terminal member of the card, and a cover member mounted in the housing and covering at least the housing and a portion of the card tray inserted into the housing. Here, the inserted card tray is a card tray of the Present Disclosure.

The Present Disclosure additionally includes a card connector in which the abutting portion includes a card detecting switch having a cantilevered contact member protruding from the front end portion of the housing towards the rear end portion. Here, the card detecting switch detects the card approaching a position at which the terminal member of the card contacts the connecting terminal when the front end of the card exposed in the notch portion of the card tray inserted into the housing comes into contact with the abutting portion and the abutting portion is displaced towards the front end portion.

The Present Disclosure also includes a card connector which also includes an insertion opening formed between the rear end portion of the housing and the rear end portion of the cover member for insertion of the card tray. Here, the insertion opening has a slit-shaped opening formed at one end, and the card tray has a protruding piece protruding from one side edge of the top panel portion. The protruding piece allows for insertion of the card tray into the slit-shaped opening only when the card tray has been properly inserted into the insertion opening.

The Present Disclosure further includes a card connector in which the card tray has a panel end portion formed at both ends of the rear panel portion, and the height dimension of the panel end portion is greater than the thickness dimension of the insertion opening.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which:

FIG. 2 shows four views of the card tray of FIG. 1, in which FIG. 2(a) is a rear view, FIG. 2(b) is a bottom view, FIG. 2(c) is a front view and FIG. 2(d) is a side view;

FIG. 4 shows perspective views of the card tray of FIG. 1, in which FIG. 4(a) is a perspective view from the front and FIG. 4(b) is a perspective view from the rear;

FIG. 5 shows enlarged views of the card tray of FIG. 1, in which FIGS. 5(a)-(c) are enlarged views of Sections A through C in FIG. 4;

FIG. 7 shows four views of the card connector of FIG. 6, in which FIG. 7(a) is a rear view, FIG. 7(b) is a bottom view, FIG. 7(c) is a front view and FIG. 7(d) is a side view;

FIG. 10 shows perspective views showing the operation when a card tray is inserted into a card connector according to an embodiment of the Present Disclosure, in which FIG. 10(a) is the view before insertion and FIG. 10(b) is the view after insertion;

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
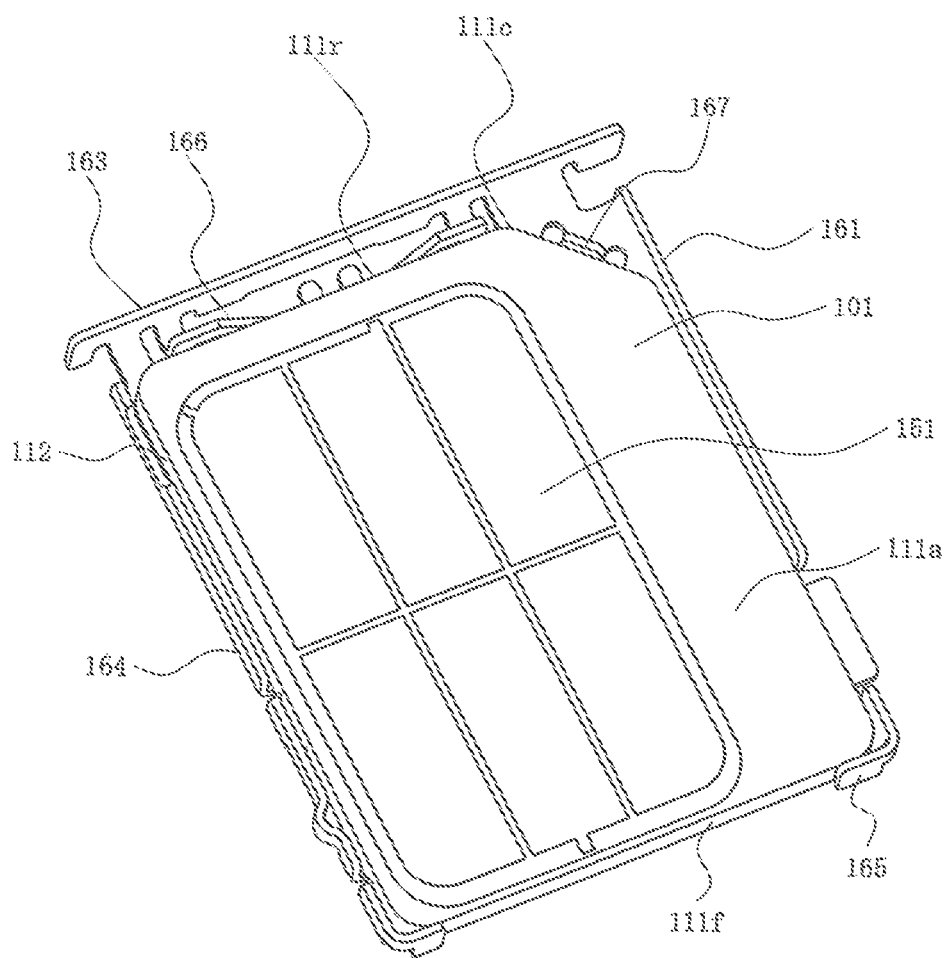
FIG. 1 shows a perspective view showing a card inserted inside a card tray according to an embodiment of the Present Disclosure.

Referring to the Figures, 161 is the card tray according to the present embodiment. As shown in FIG. 1, the card tray including a card 101 is inserted into the card connector 1, mounted in an electronic device. In other words, the card 101 is accommodated inside the card tray 161 and is mounted in the electronic device via the card connector 1. In the present embodiment, the card 101, as shown in FIG. 1, has a substantially rectangular shape. The contact pads 151, serving as electrode pads, are arranged on the bottom face 111a of the card in rows along the front end 111f and the rear end 111r. In the example shown, three are arranged in two rows. In other words, the contact pads 151 are disposed in two rows extending in the width direction of the card 101. Contact pads 151 are not disposed on the top face on the opposite side from the bottom face 111a. A notch portion 111c is formed in one corner where a side edge 112 meets the left or right rear end 111r. Here, the rear right corner of the bottom face 111a is cut off at an angle.

Here, the card tray 161 is formed by punching or bending a metal plate, and has a substantially rectangular top panel portion 162, a pair of side panel portions 164 extending longitudinally along the side edge of the top panel portion 162 and extending downward from the side edge of the top panel portion 162, a front panel portion 165 extending widthwise along the front edge of the top panel portion 162 and extending downward from the front edge of the top panel portion 162, and a rear panel portion 163 extending widthwise along the rear edge of the top panel portion 162 and extending downward from the rear edge of the top panel portion 162. As shown in FIG. 1, when a card 101 is accommodated inside, the top panel plate 162 regulates the position in the thickness direction of the card 101 opposite the upper face of the card 101 (the face on the opposite side from the contact pads 151), the side panel portions 164 regulate the position of the card 101 in the width direction (short axis direction) opposite the side edges 112 of the card 101, and the front panel portion 165 and the rear panel portion 163 regulate the position of the card 101 in the length direction (long axis direction) opposite the front end 111f and rear end 111r of the card 101. The card tray 161 does not have a bottom panel portion. In other words, there is no member on the side opposite the top panel portion 162, and the bottom face 111a of the accommodated card 101 is exposed.

Figure 2:
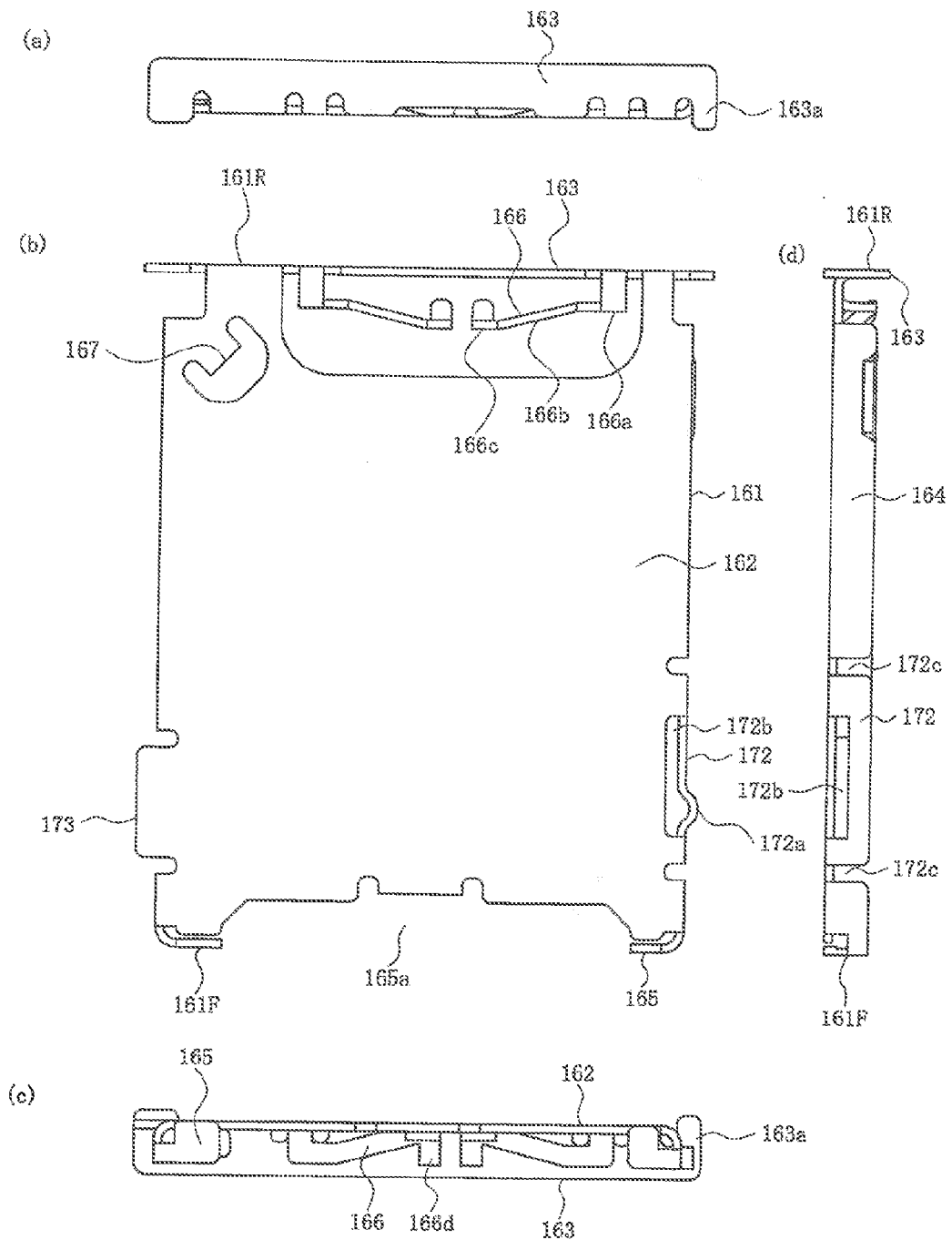

In the present embodiment, the end portion in the forward direction when inserted into the card connector 1 (the lower end in FIG. 3) is the front end 161F, and the end portion in the reverse direction (the upper end in FIG. 3) is the rear end 161R. A notch portion 165a of a predetermined width is formed in the front panel portion 165 located at the front end 161F of the card tray 161, and at least a portion of the front end 111f of the card 101 is exposed at the front end 161F via the notch portion 165a. In the example shown, more than half including the center line of the front plate portion 165 in the width direction is the notch portion 165a, and the portion of the front end plate 165 outside of the notch portion 165a is at both ends of the top panel portion 162 in the width direction; that is, near the side panel portions 164 on the left and right sides. The position and size of the notch portion 165a can be changed if necessary. However, the notch portion 165a is preferably formed so that no front panel portion 165 remains in the portion corresponding to the portion of the card connector 1 in which the terminals 51 described below are disposed. In this way, when inserted into the card connector 1, the front panel portion 165 does not interfere with the terminals 51 and the terminals 51 are reliably kept from being damaged. As shown in FIG. 2 (b), the notch portion 165a preferably includes a portion near the front edge of the top panel portion 162. In other words, a portion near the front edge of the top panel portion 162 is preferably notched.

An elastic arm portion 166 is disposed, as a card holding spring portion, in a position near the rear panel portion 163 located at the rear end 161R of the card tray 161. The elastic arm portion 166 is integrally formed with the rear panel portion 163, and has a mounting portion 166a mounted on the rear panel portion 163, a cantilevered main portion 166b whose base end is connected to the mounting member 166a and which extends laterally, an abutting portion 166c connected to the free end of the main portion 166b, and a guiding portion 166d connected to the bottom end of the abutting portion 166c. The abutting portion 166c biases the rear end 111r of the card 101 accommodated inside the card tray 161 forward due to the spring action of the main portion 166b, and the front end 111f of the card 101 is pressed into the abutting portion 165d, which is the inner face of the front panel portion 165. As a result, the card 101 is pinched longitudinally between the abutting portion 166c of the elastic arm portion 166 and the abutting portion 165c of the front panel portion 165. In other words, the card 101 is elastically gripped longitudinally due to the spring action of the elastic arm portion 166. As a result, the card 101 accommodated inside the card tray 161 does not come out of the card tray 161 even though the bottom of the card tray 161 is open.

Figure 5:
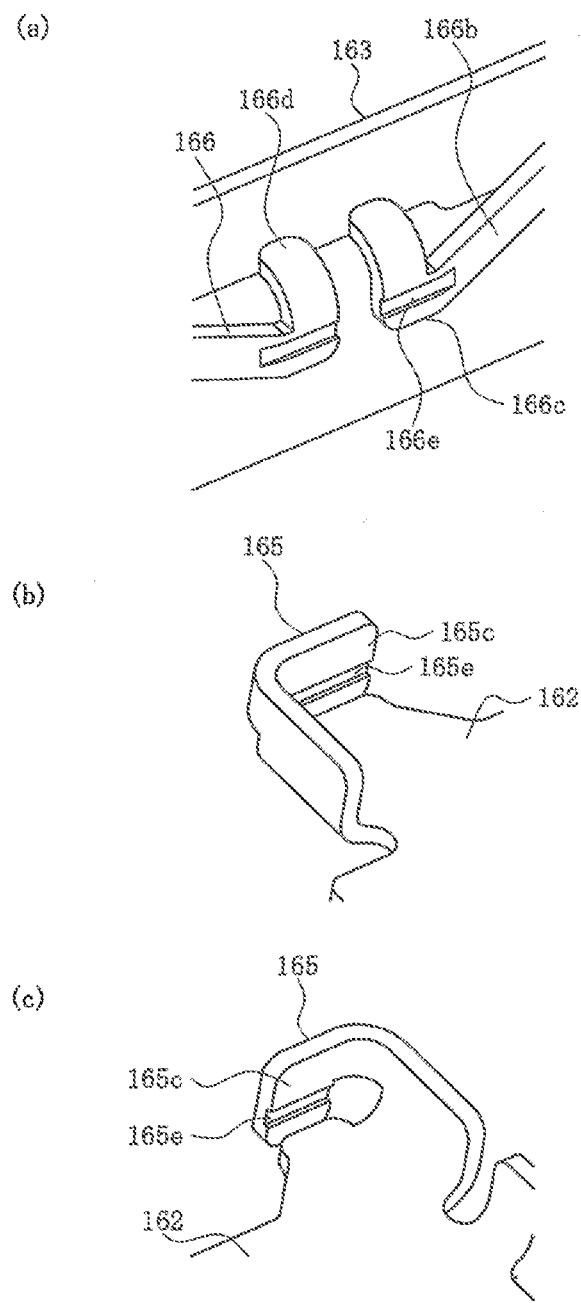

As shown in FIG. 5, recessed grooves 166e form an uneven portion in the abutting portion 166c of the elastic arm portion 166, and in the abutting portion 165c of the front panel portion 165. These increase the friction between the abutting portion 166c of the elastic arm portion 166 and the rear end 111r of the card 101 and the friction between the abutting portion 165c of the front panel portion 165 and the front end 111f of the card 101. This also displaces the card 101 accommodated inside the card tray 161 downward, and keeps the card 101 from coming out of the card tray 161. This is especially effective when the surface precision of the card 101 is low, and the face of the rear end 111r and the front end 111f is uneven. Instead of recessed grooves 165e, 166e, the abutting ends 165c, 166c can be rendered uneven by surface coarsening.

When a card 101 is accommodated inside the card tray 161, the guiding portion 166d guides the rear end 111r of the card 101 towards the abutting portion 166c, and a smooth round curved surface is provided so that the rear end 111r of the card 101 can slide smoothly. In other words, the guiding portion 166d is R-shaped.

A positioning claw portion 167 extending downward is formed in the corner where a side edge joins a rear edge of the top panel portion 162; more specifically, in the rear right corner. The positioning claw portion 167 functions as a card orientation regulating portion. When the card 101 is inserted properly as shown in FIG. 1, it allows the card 101 to be accommodated inside the card tray 161. However, when the card 101 is inserted improperly, it does not allow the card 101 to be accommodated inside the card tray 161. In other words, the card 101 cannot be accommodated inside the card tray 161. More specifically, the positioning claw portion 167 is formed to face the notch portion 111c of a card 101 accommodated properly inside the card tray 161. Therefore, when a card 101 is inserted into the card tray 161 improperly, the bottom face 111a or top face of the card 101 comes into contact with the positioning claw portion 167, and the card 101 cannot be inserted and accommodated inside the card tray 161.

The card tray 161 is accommodated and held so that the bottom face 111a of the card 101 on which the contact pads 151 are disposed faces the side opposite that of the top panel portion 162. As a result, the top panel portion 162 does not require a large opening such as the open portion 970 in the card tray 961 described above. Thus, the strength and rigidity of the top panel portion 162 is not reduced, and that of the card tray 161 can be maintained.

The height dimension of the side panel portion 164 and front panel portion 165, that is, the dimension in the vertical direction (the longitudinal direction in FIG. 2 (d)), is smaller than the thickness dimension of the card 101. In this way, when inserted into the card connector 1, the lower ends of the side panel portion 164 and the front panel portion 165 are positioned above the bottom face 111a of the card 101, and the lower ends of the side panel portion 164 and the front panel portion 165 do not abut the bottom wall portion 11b of the housing 11 of the card connector 1 described below. Thus, components such as the terminals 51 disposed on the bottom wall portion 11b of the housing 11 are not damaged.

The height dimension of the rear panel portion 163 is greater than the thickness dimension of the card 101, and preferably greater than the thickness dimension of the insertion opening 18 of the card connector 1, which is described below. The panel end portions 163a on the ledge and right sides of the rear panel portion 163 function as insertion preventing portions. Therefore, at least the height dimension of the panel portion 163a is greater than the thickness dimension of the insertion opening 18. This reliably prevents insertion of the card tray 161 into the card connector 1 from the insertion opening 18 with the wrong orientation, such as backwards or upside down.

The card tray 161 also has a protruding piece 173 as an insertion preventing portion, which protrudes outward from a side edge (the right side edge in FIG. 3) of the top panel portion 162 near the front end 161F, and is flush with the top panel portion 162. An insertion allowing slit 18a is formed in the end of the insertion opening 18 of the card connector 1, which allows for insertion of the protruding piece 173 when the card tray 161 is oriented properly. In this way, the card tray 161 can be reliably prevented from being inserted into the card connector 1 from the insertion opening 18 with the wrong orientation, such as backwards or upside down.

Figure 3:
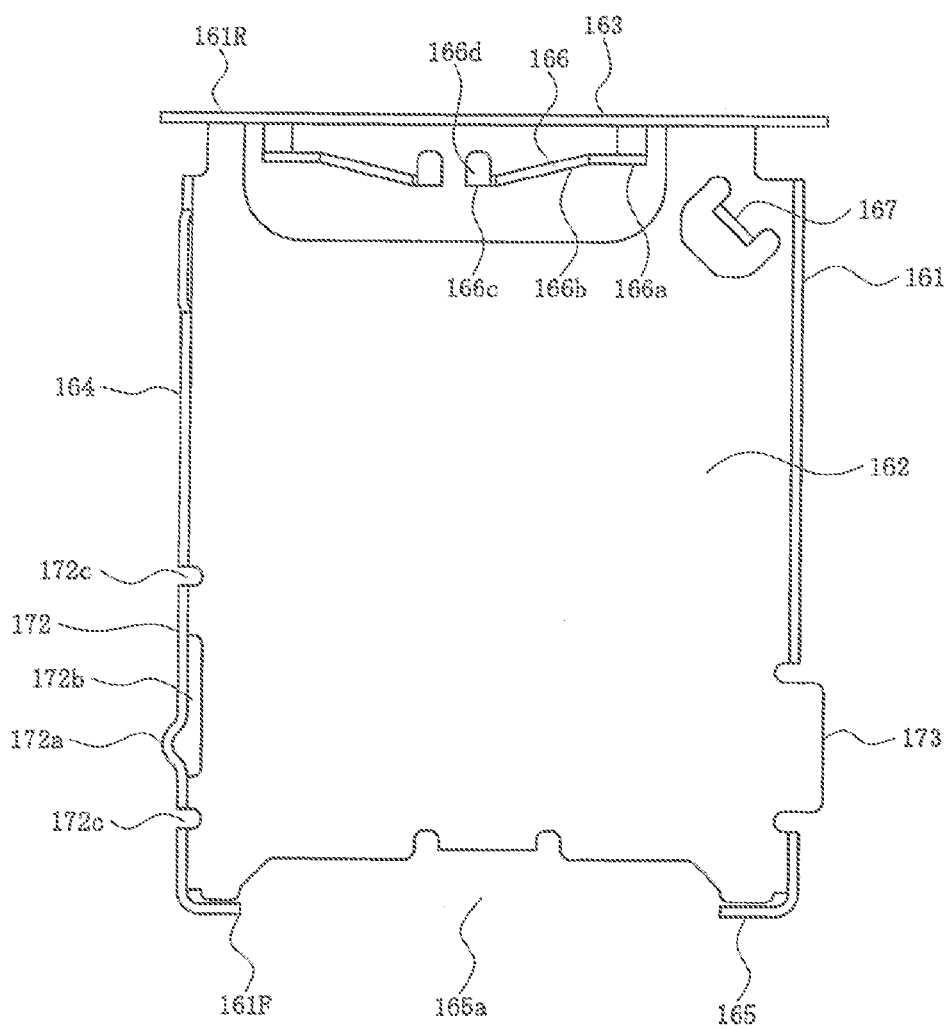
FIG. 3 shows a top view of the card tray of FIG. 1.
Figure 4:
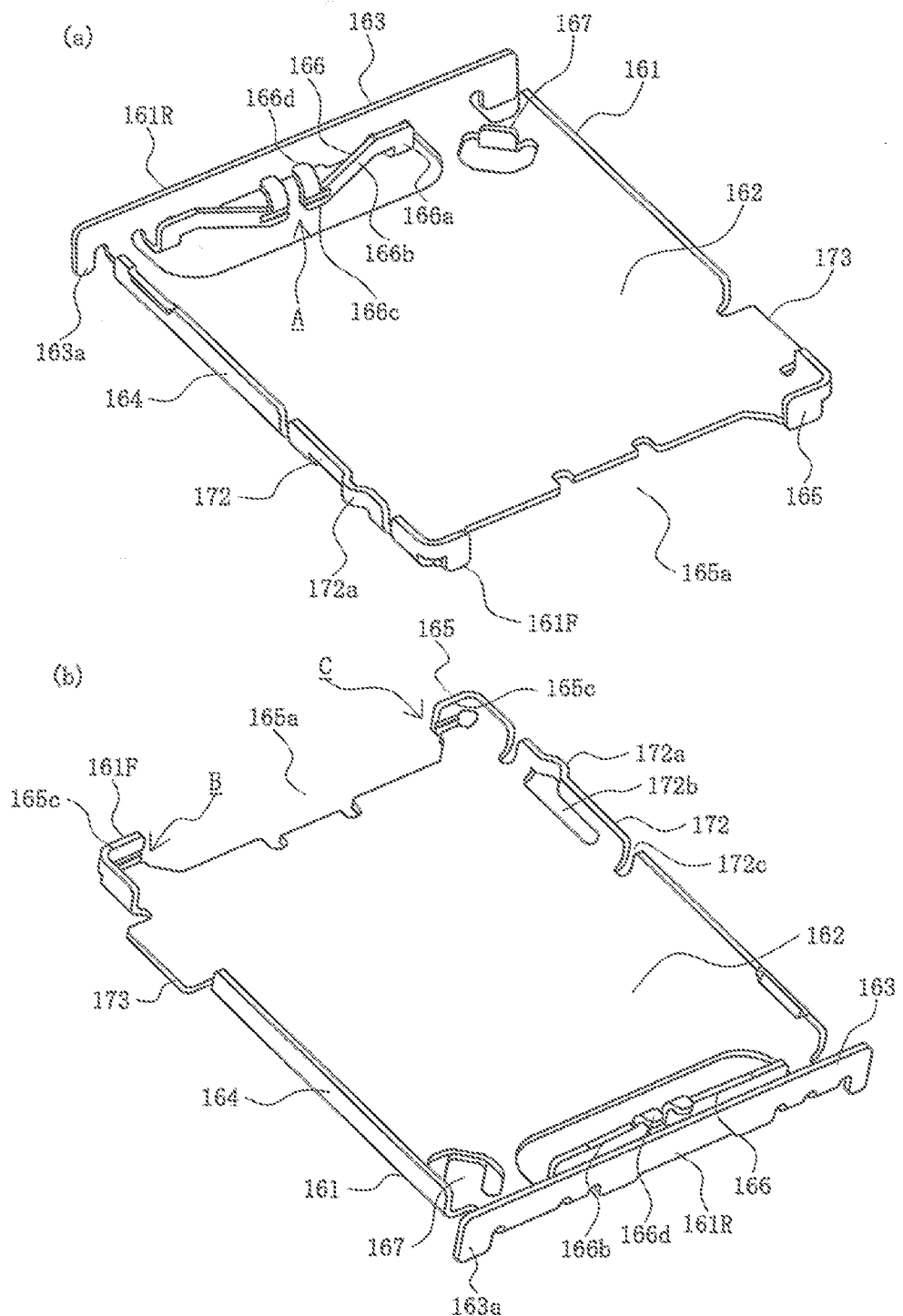

The card tray 161 has an engaging portion 172 formed independently from the side panel portion 164 on one side edge of the top panel portion 162 (the left side edge in FIG. 3). The engaging portion 172 engages the sliding member 21 of the tray guiding mechanism described below when inserted into the card connector 1, and includes an engaging protruding portion 172a. More specifically, the engaging portion 172 runs longitudinally along the side edge of the top panel portion 162, and extends downward from the top panel portion 162. It is substantially flush with the side panel portion 164, but is separated from the side panel portion 164 by a separating slit 172c. Also, a slit-shaped separating opening 172b is formed in the boundary portion between the top panel portion 162 and the engaging portion 172. In this way, the engaging portion 172 can be elastically deformed and smoothly engage/disengage the sliding member 21.

Figure 7:
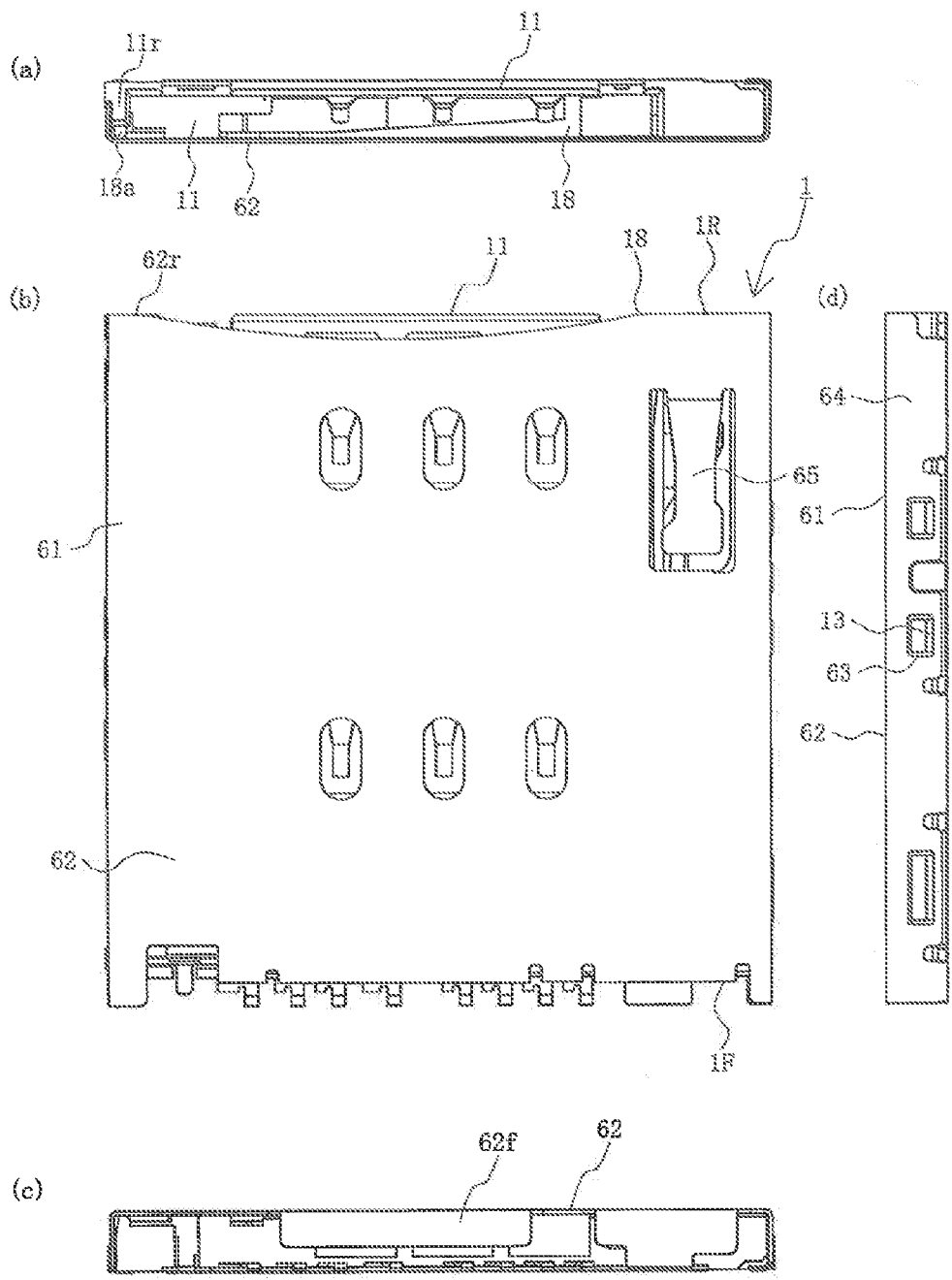

In the present embodiment, the card connector 1 has a housing 11 integrally molded from an insulating material, and a shell 61 serving as a cover member integrally formed by punching or bending a metal plate and mounted on the upper side of the housing 11. The shell 61 covers the housing 11 and at least a portion of the upper face of the card tray 161 inserted into the housing 11. The card connector 1 has a substantially flat rectangular shape, and is mounted in an electronic device. The card tray 161 is inserted into the housing 11 from the insertion opening 18 in the rear (upward in FIG. 7 (b)). More specifically, the card tray 161 is inserted into a space formed between the housing 11 and the shell 61. Also, the end portion at the front in the insertion direction of the card tray 161 into the card connector 1 (downward in FIG. 7 (b)) is the front end 1F, and that the rear in the insertion direction (upward in FIG. 7 (b)) is the rear end 1R.

Figure 8:
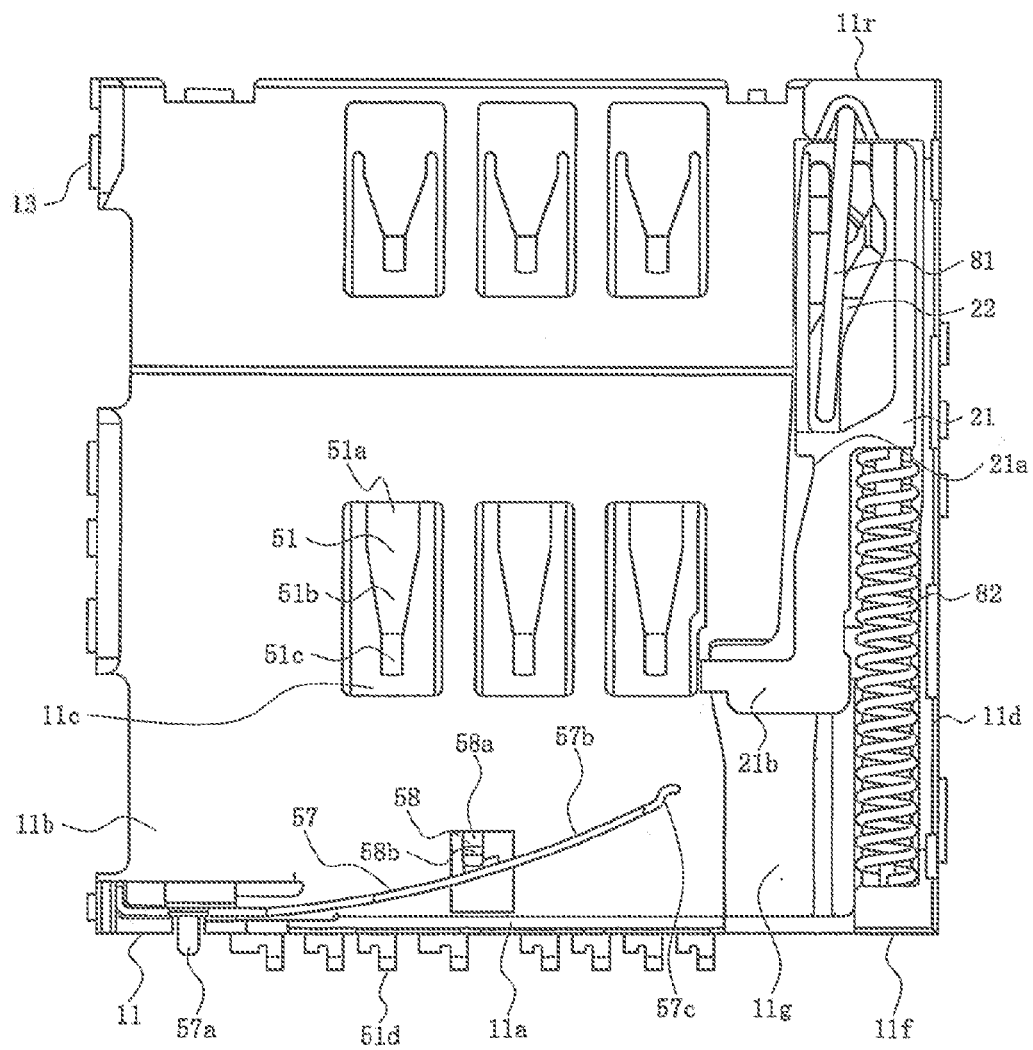
FIG. 8 shows a planar view showing the card connector of FIG. 6 with the shell removed.

As shown in FIG. 8, the housing 11 has a bottom wall portion 11b, which is a substantially rectangular panel-shaped member, and an inner wall portion 11a which runs along the end portion at the front in the insertion direction of the card tray 161 in the housing 11, that is, the front end portion 11f, and extends upward from the bottom wall portion 11b. The end portion at the rear in the insertion direction of the card tray 161 in the housing 11 is the rear end portion 11r. Here, the bottom wall portion 11b has terminal holding recessed portions 11c holding the terminals 51 serving as the connecting terminals. The terminal holding recessed portions 11c are openings passing through the bottom wall portion 11b in the thickness direction, and form rows extending in the width direction of the housing 11. In the example shown, there are two rows of three recessed portions. In other words, the terminal holding recessed portions 11c and each one of the terminals 51 held by a terminal holding recessed portion 11c are arranged in two rows extending in the width direction of the housing 11.

At least a portion of the base portion 51a of each terminal 51 is embedded in the bottom wall portion 11b, and the rest is exposed inside the terminal holding recessed portions 11b. More specifically, the terminals 51 are "over molded;" that is, the terminals 51 are set inside the metal cavity of the housing 11 which is then filled with an insulating material so that at least a portion of the base portion 51a is covered by the insulating material constituting the bottom wall portion 11b, thereby embedding and holding the terminals in the bottom wall portion 11b.

Each terminal 51 has a cantilevered contact arm portion 51b connected to the base end of the base portion 51a, and a contact portion 51c connected to the tip or free end of the contact arm portion 51b. The contact arm portion 51b has a base end positioned on the rear terminal portion 11r, and a tip extending at an angle upward towards the front end portion 11f. At least the upper face of the contact portion 51c is positioned above the bottom wall portion 11b when a card 101 accommodated in a card tray 161 has not been inserted into the card insertion space. The contact portion 51c has a side surface shape curved so as to extend upward, and the tip faces down at an angle. As shown in FIG. 8, the contact arm portion 51b and the contact portion 51c are positioned inside the terminal holding recessed portion 11c when viewed from above. The terminals 51 are arranged so that the contact portions 51c come into contact with the contact pads 151 on the card 101 inside the card tray 161 held inside the card connector 1. Thus, the number and arrangement of terminals 51 depend on the number and arrangement of contact pads 151 on the card 101.

One end of a slender band-shaped connector, not shown, is connected to the base portion 51a of the terminal 51. This connector extends in the longitudinal direction of the housing 11, and is embedded in the bottom wall portion 11b. A solder tail portion 51d extends forward from the other end of the connector, and protrudes from the front end portion 11f where it is exposed in the front. The solder tail portion 51d is electrically connected to an opposing terminal member.

The housing 11 has a pair of side wall portions 11d extending longitudinally along the side edge, and a tray guiding mechanism accommodating portion 11g is formed inside one of the side wall portions 11d. A sliding member 21 of the tray guiding mechanism used to guide the card tray 161 inserted into the card connector 1 is slidably mounted in the tray guiding mechanism accommodating portion 11g so as to be able to slide longitudinally. In this way, the sliding member 21 can slide longitudinally along one of the side wall portions 11d.

Also, a cam groove 22 serving as a heart-shaped cam is formed on the upper face of the sliding member 21, and the free end of a slender pin member 81 serving as a fixed cam member engages the cam groove 22. The other end of the pin member 81 is fixed pivotally to the upper face of the rear end portion 11r of the housing 11 as the fixed end. The pin member 81 and the cam groove 22 work together to perform a push/push operation on the sliding member 21 moving along with the card tray 161. A biasing member 82 or coil spring is accommodated inside the tray guiding mechanism accommodating portion 11g to provide biasing force in a compressed state which biases the sliding member 21 towards the rear end portion 11r; that is, in the ejection direction of the card tray 161 which is the direction opposite that of the insertion direction.

The sliding member 21 has an engaging recessed portion 21a and engaging hook portion 21b serving as a tray holding portion which engages and holds the card tray 161. The engaging recessed portion 21a engages the engaging protruding portion 172a formed in the engaging portion 172 of the card tray 161, and the engaging hook portion 21b engages the corner where the front panel portion 165 joins the side panel portion 164 in the card tray 161. The sliding member 21 holds the card tray 161 using the engaging recessed portion 21a and the engaging hook portion 21b, and moves longitudinally along with the card tray 161.

A card connector 1 with this tray guiding mechanism has to operate so as to push in a card tray 161 when a card tray 161 is inserted into the card connector 1 and when the card tray 161 is ejected from the card connector 1. In other words, it requires a push-in/push-out or push/push operation. This operation is similar to the alternating operation of a push button (position-holding button or push-in/push-out button). The pin member 81 and the cam groove 22 work together to perform the push/push operation on the sliding member 21 moving with the card tray 161. In this way, the tray guiding mechanism is able to push the card tray 161 until the card tray 161 has been moved in the insertion direction. When it reaches the end point, the biasing force of the biasing member 82 moves the card tray 161 from the end point in the ejection direction, which is the direction opposite that of the insertion direction. At the locking position, the sliding member 21 stops. In this way, the card tray 161 is held inside the card connector 1.

The pin member 81 is biased downward by the pin pressing member 65 of the shell 61 and held. The pin pressing member 65 is an elastic plate-like member formed by compressibly bending a portion of the shell 61 in the direction of the bottom wall portion 11b of the housing 11, and the pin member 81 is positioned between the pin pressing member 65 and the sliding member 21 or housing 11, and held so as not to be released by the sliding member 21 or housing 11.

The shell 61 has a substantially rectangular top panel portion 62 and a side panel member 64 protruding from the side edge of the top panel portion 62. A plurality of locking openings 63 are formed in the side panel portion 64. When the shell 61 is mounted on the upper side of the housing 11, the locking openings 63 are locked in the locking protrusions 13 formed in the outer side surface of the side wall portion 11d of the housing 11. In this way, the shell 61 is secured in the housing 11. The front and rear end portions at the top panel portion 62 in the insertion direction are the shell front end portion 62f and shell rear end portion 62r.

A card detecting switch is provided near the front end portion 11f of the housing 11 to detect contact between the contact pads 11 of the card 101 and the terminals 51 and thus insertion of the card 101 into the card connector 1. The card detecting switch is formed by the front end portion 11f, a cantilevered first contact member 57 mounted nearby, and a second contact member 58 embedded mostly in the bottom wall portion 11b.

The first contact member 57 has a mounting portion 57a mounted in the front end portion 11f, a cantilevered main portion 57b whose base end is connected to the mounting portion 57a and extends in the lateral direction, and an abutting portion 57c connected to the free end of the main portion 57b. The mounting portion 57a is substantially parallel to the side face of the inner wall portion 11a, the main portion 57b is inclined towards the side face of the inner wall portion 11a when a card 101 is not inserted into the card connector 1, and the abutting portion 57c is arranged so as to protrude towards the rear end portion 11r, that is, towards the rear. Thus, when a card 101 is inserted, the front end 111f of the card 101 abuts the abutting portion 57c. The second contact member 58 has a plate-shaped mounting portion 58a embedded in the bottom wall portion 11b, and a contact portion 58b whose base end is connected to the mounting portion 58a and whose tip is exposed from the bottom wall portion 11b.

When a card 101 is not inserted, as shown in FIG. 8, the main portion 57b of the first contact member 57 comes into contact with the contact portion 58b of the second contact member 58. As a result, the first contact member 57 comes into contact with the second contact member 58, and the card detecting switch is activated or turned on. However, when a card 101 is inserted and the contact pads 151 and terminals 51 come into contact, the abutting portion 57c of the first contact member 57 is displaced and pushed towards the front end portion 11f by the front end 111f of the card 101, and the main portion 57b of the first contact member 57 is separated from the contact portion 58b of the second contact member 58. In this way, the first contact member 57 and the second contact member 58 do not come into contact, and the card detecting switch is deactivated or turned off. In this way, the card 101 reaching the point where the contact pads 151 and terminals 51 come into contact is detected.

A notch portion 165a is formed in the front panel portion 165 of the card tray 161 so that at least a portion of the front end 111f of the card 101 is exposed from the front end 161F of the card tray 161 when a card 101 inside a card tray 161 has been inserted into the card connector 1. The notch portion 165a is formed to include at least a portion corresponding to the abutting portion 57c of the first contact member 57. In this way, the front end 111f of the card 101 makes direct contact with the abutting portion 57c and does not contact the main panel portion 165 of the card tray 161 even when the card 101 is inserted while accommodated in a card tray 161. Therefore, the card detecting switch can properly detect when the card 101 has reached a predetermined position, where the contact pads 151 and the terminals 51 establish contact.

A notch portion 165a is formed in the portion corresponding to the abutting portion 57c of the first contact member 57 in the front panel portion 165 of the card tray 161, and the abutting portion 57c does not come into contact with any portion of the card tray 161 because of the absence of the front panel portion 165 when a card tray 161 that does not contain a card 101 is inserted. Therefore, the card detecting switch does not detect any card 101 at the predetermined position. In other words, when a card tray 161 that does not contain a card 101 is inserted, it does not mistakenly detect the insertion of a card 101.

When a card tray 161 not containing a card 101 is inserted, the card detecting switch does not detect the presence of a card 101. Therefore, when the card tray 161 and card connector 1 are not being used, the empty card tray 161 can be stored inside the card connector 1. As a result, the empty card tray 161 is not misplaced.

Figure 6:
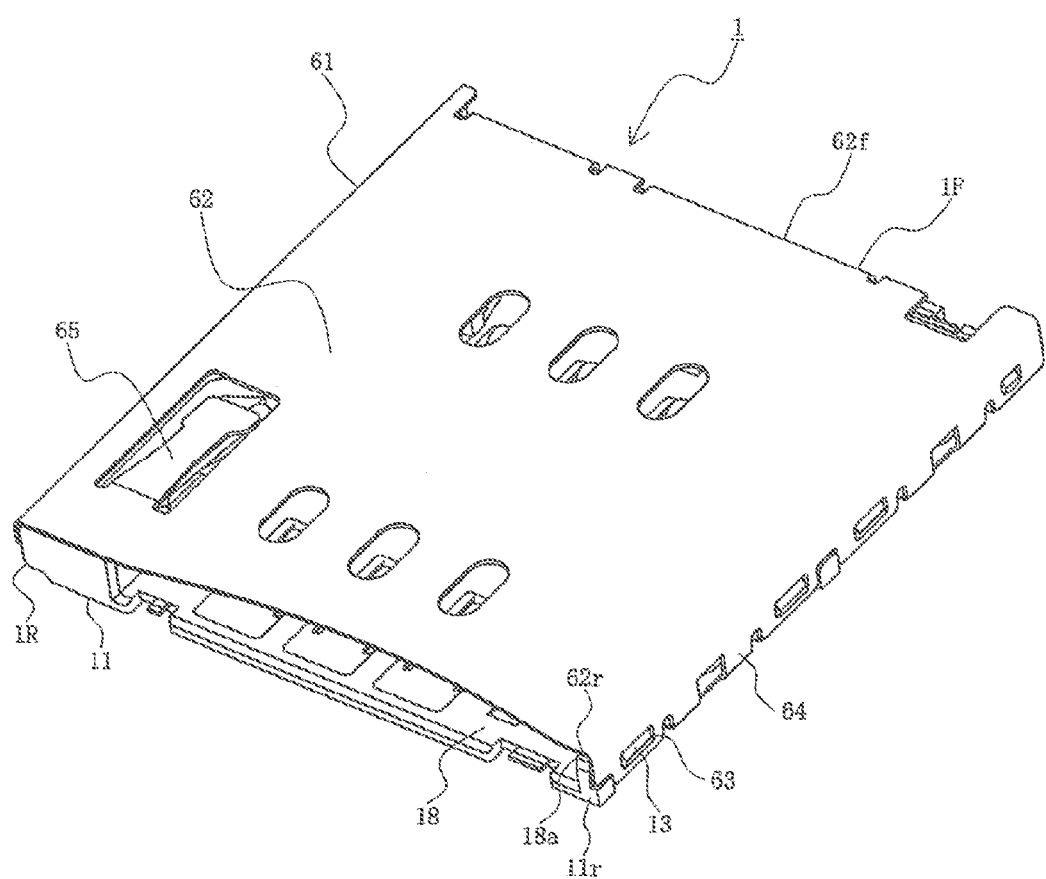
FIG. 6 shows a perspective view of a card connector according to an embodiment of the Present Disclosure.

As shown in FIGS. 6 and 7(a), an insertion allowing slit 18a serving as a mistaken insertion preventing portion is formed in one end of the insertion opening 18. More specifically, the insertion allowing slit 18a is a slit-like gap between the shell rear end portion 62r and the upper face of the rear end portion 11r of the housing 11 on the side opposite the tray guiding mechanism accommodating portion 11g. This slit-like gap extends in the width direction of the card connector 1. When a card tray 161 is properly inserted into the insertion opening 18, the protruding piece 173 of the card tray 161 can pass through the slit-like opening formed at this position. In other words, the protruding piece 173 is allowed to pass when the card tray 161 is inserted properly. Thus, when a card tray 161 has been inserted improperly, the protruding piece 173 comes into contact with the rear end portion 11r on the opposite side from the insertion allowing slit 18a, and the card tray 161 cannot be inserted into the insertion opening 18.

Also, when the card tray 161 is inserted improperly, the card tray 161 cannot be inserted into the insertion opening 18 because the height dimension of the panel end portions 163a on both the left and right rear panel portions 163 is greater than the thickness dimension of the insertion opening 18. At this time, the shell rear end portion 62r and the rear end portion 11r of the housing 11 function as mistaken insertion preventing portions for the card connector 1.

In operation, the user of the card tray 161 and card connector 1 can grasp the card 101 and control the orientation so that the upper face is aligned with the top panel portion 162 of the card tray 161, the bottom face 111a is aligned opposite the top panel portion 162 of the card tray 161, and the front end 111f and the rear end 111r are aligned with the front panel portion 165 and the rear panel portion 163 of the card tray 161. In this way, the card 101 is properly oriented so that the notch portion 111c is aligned with the positioning claw portion 167 of the card tray 161.

Figure 9:
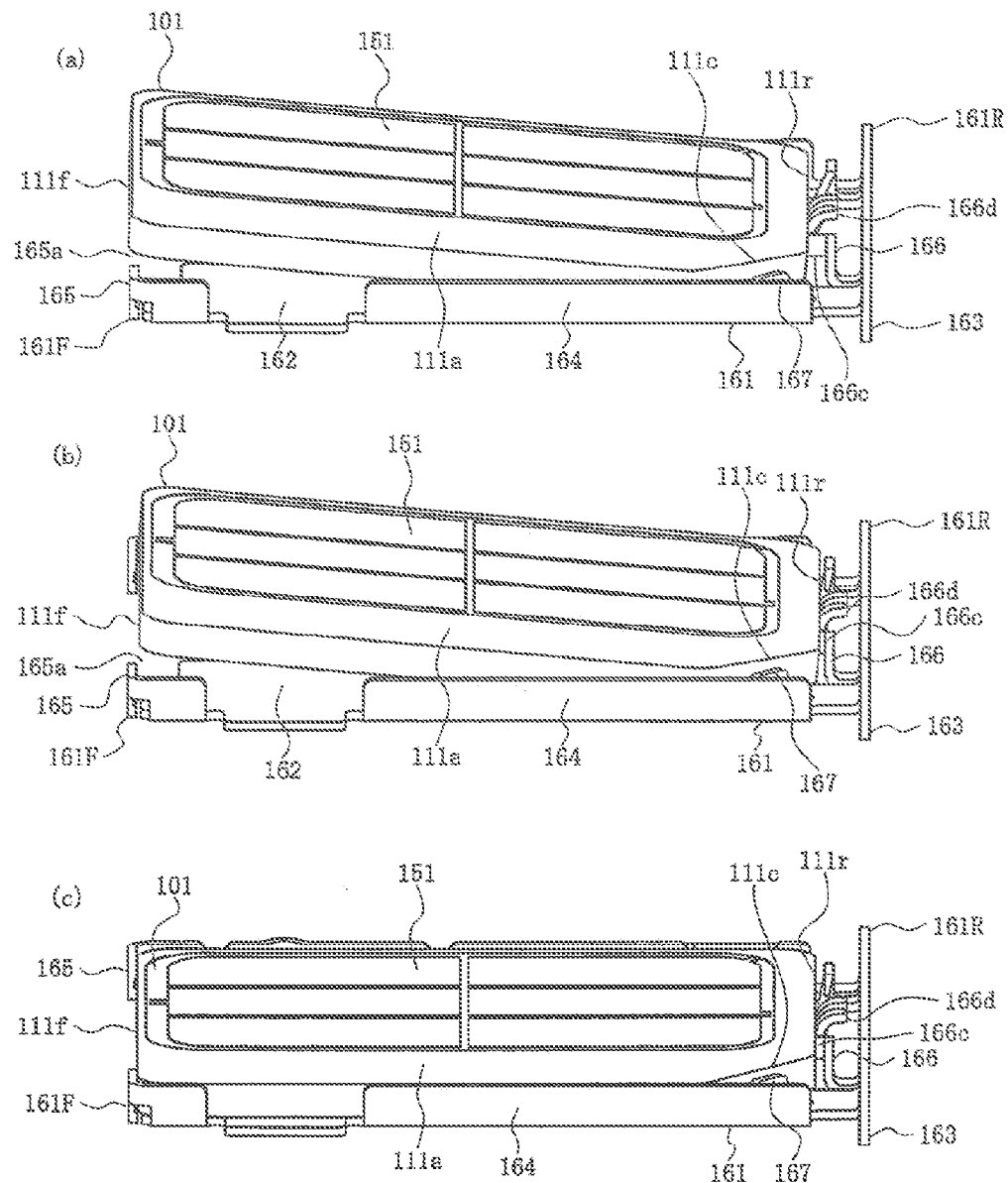
FIG. 9 shows perspective views showing the operation when a card is set into a card tray according to an embodiment of the Present Disclosure.

The user inserts the card 101 into the card tray 161 from the rear end 111r. In other words, the card 101 is inclined towards the top panel portion 162 of the card tray 161, the rear end 111r is inserted into the card tray 161 and comes into contact with the top panel portion 162 and, as shown in FIG. 9(a), comes into contact with the abutting portion 166c of the elastic arm portion 166. When the user applies pressure to the card 101 towards the rear, that is, towards the rear end 161R of the card tray 161, the elastic arm portion 166 is elastically deformed and, as shown in FIG. 9(b), the abutting portion 166c of the elastic arm portion 166 is elastically deformed towards the rear panel portion 163. As a result, the entire card 101 is displaced towards the rear end 161R of the card tray 161 in the card tray 161, and the front end 111f is positioned to the rear of the front panel portion 165 of the card tray 161.

Next, the user inserts the front end 111f into the card tray 161, which abuts the top panel portion 162, and the pressure applied to the rear end 161R of the card tray 161 is released.

When this occurs, the spring action of the elastic arm portion 166 elastically displaces the abutting portion 166c, and separates it from the rear panel portion 163. As a result, the entire card 101 is displaced towards the front end 161F of the card tray 161 in the card tray 161 and, as shown in FIG. 9(c), the front end 111f abuts with the front panel end 165 of the card tray 161.

In this way, the setting of the card 101 into the card tray 161 is completed, and the card 101, as shown in FIG. 1, is accommodated inside the card tray 161. In this state, as described above, the card 101 is pinched longitudinally by the abutting portion 166c of the elastic arm portion 166 and the abutting portion 165c of the front panel portion 165. This keeps the card from coming out of the card tray 161.

As shown in FIGS. 9(a)-(c), the user inserts the card 101 into the card tray 161 from the front end 111f, instead of inserting the card 101 into the card tray 161 from the rear end 111r. More specifically, the user first inclines the card 101 towards the top panel portion 162 of the card tray 161, and inserts the front end 111f into the card tray 161 until the top panel portion 162 is abutted and the front panel portion 165 is abutted.

Next, the user inserts the rear end 111r into the card tray 161. In other words, the rear end 111r is displaced towards the rear panel portion 162. Then, the rear end 111r abuts the guiding portion 166d of the elastic arm portion 166. When the user applies pressure to the rear end 111r of the card 101 towards the top panel portion 162, the rear end 111r is displaced towards the top panel portion 162 along the guiding portion 166d, and the guiding portion 166d and the abutting portion 166c connected to the guiding portion 166d resist the spring action of the elastic arm portion 166 and are displaced closer to the rear panel portion 163. At this time, the surface of the guiding portion 166d can smoothly displace the rear end 111r of the card 101 towards the top panel portion 162 because the surface of the guiding portion 166d is a smooth curved face.

Finally, when the rear end 111r of the card 101 abuts the top panel portion 162, as shown in FIG. 9(c), the setting of the card 101 into the card tray 161 has been completed.

When the card 101 is to be removed from the card tray 161, the user first places a finger on the front end 111f of the card 101 in the position shown in FIG. 9(c), and applies pressure to the front end 111f in the direction separating the card tray 161 from the top panel portion 162. Preferably, pressure is also applied towards the rear end 161R of the card tray 161. Because a notch portion 165a has been formed in the front panel portion 165 of the card tray 161, the user can easily apply pressure to the front end 111f of the card 101. In this way, the front end 111f of the card 101 is separated from the top panel portion 162 of the card tray 161 as shown in FIG. 9(a). In this way, the user can easily remove the card 101 from the card tray 161.

In the present embodiment, when the card 101 is set in the card tray 161, the card 101 is not inserted into the card tray 161 from the rear end 111r, but rather the card 101 is inserted into the card tray 161 from the front end 111f. The card 101 can also be easily removed from the card tray 161. It is therefore easier to use.

Figure 10:
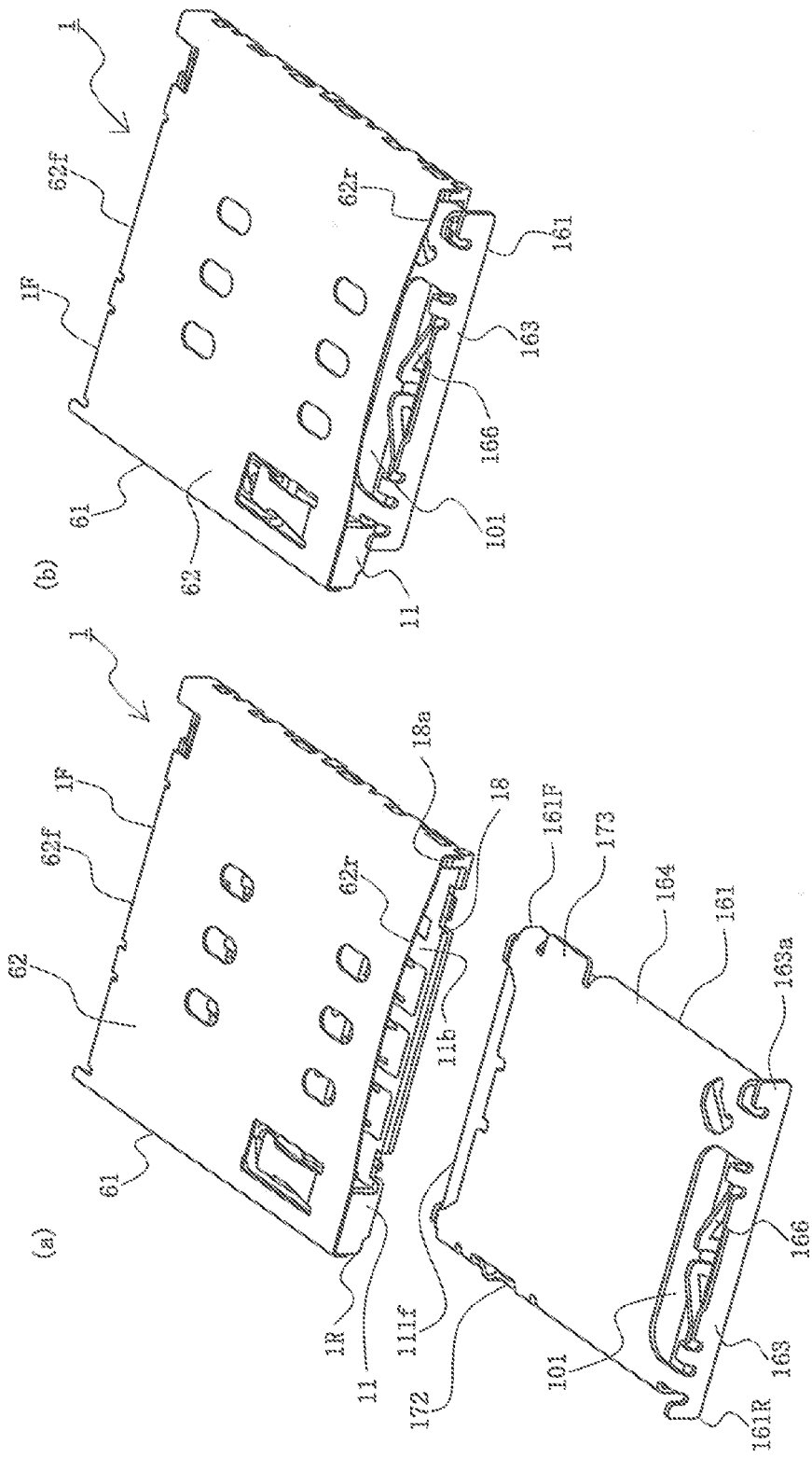

When inserting a card tray 161 containing a card 101 into the card connector 1, the user, as shown in FIG. 10 (a), uses inserts the card tray 161 containing a card 101 from the insertion opening 18 to the rear of the card connector 1 into the card insertion space formed between the housing 11 and the shell 61. The card tray 161 is aligned upward with the top panel portion 162, that is, the top panel portion 62 of the shell 61, and the front end 161F is aligned with the front end 1F of the card connector 1. In other words, it is inserted properly. Also, the protruding piece 173 on the card tray 161 is aligned with the insertion allowing slit 18a formed on one end of the insertion opening 18 in the card connector 1. Here, the card 101 accommodated inside the card tray 161 is aligned so that the open bottom face 111a including the contact pads 151 is facing downward towards the bottom wall portion 11b of the housing 11 including the terminal 51, and so that the front end 111f faces the front end 1F of the card connector 1. When the card tray 161 is inserted from the insertion opening 18 into the card insertion space formed between the housing 11 and the shell 61, the protruding piece 173 passes through the insertion allowing slit 18a, and the side panel portion 164 on which the engaging portion 172 is not formed passes through the card insertion space along the side wall portion 11d of the housing 11 on which the tray guiding mechanism accommodating portion 11g has not been formed.

Figure 11:
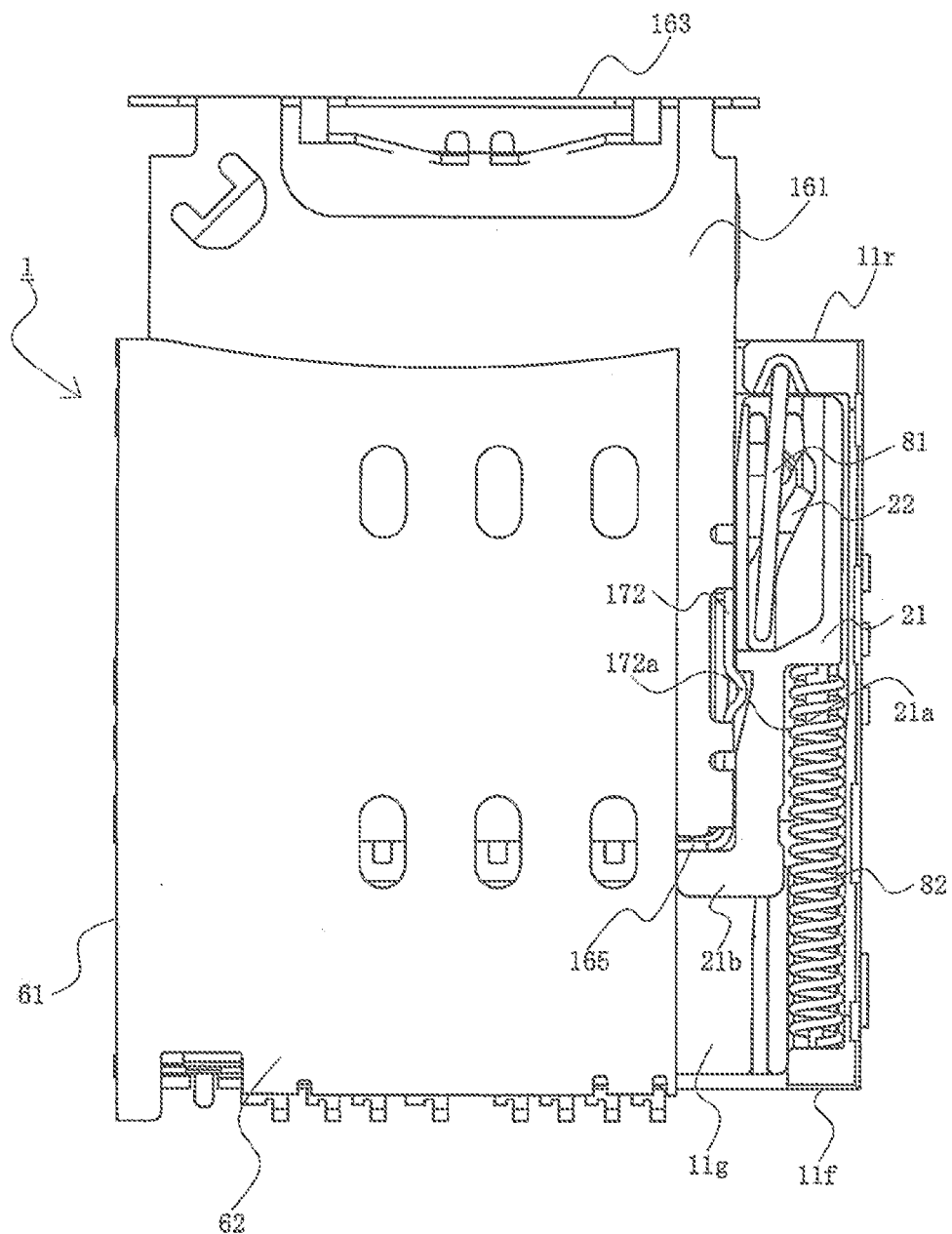
FIG. 11 shows a first planar view showing the operation when a card tray is inserted into a card connector according to an embodiment of the Present Disclosure with the shell partially removed.

Next, when the user pushes the card tray 161 further in, as shown in FIG. 11, the engaging recessed portion 21a and the engaging hook portion 21b of the sliding member 21 engage the engaging portion 172 of the card tray 161 and the corner where the front panel portion 165 and the side panel portion 164 of the card tray 161 to hold the card tray 161, and the card tray 161 containing the card 101 is moved towards the sliding member 21 and the front end 1F of the card connector 1. At this time, the force applied by the user is transmitted from the card tray 161 to the sliding member 21. Because the sliding member 21 compresses the biasing member 82, which is a coil spring, the sliding member 21 and the card tray 161 are subjected to the rebounding force of the biasing member 82. However, because the rebounding force is smaller than the force applied by the user, the rebounding force is resisted. Here, the sliding member 21 slides along the tray guiding mechanism accommodating portion 11g, and the card tray 161 moves along with the sliding member 21. The sliding member 21 and the card tray 161 reach the overstroke position, which is the farthest forward position, and enter an overstroke state.

The height dimension of the side panel portion 164 and front panel portion 165 of the card tray 161 is smaller than the thickness dimension of the card 101. When the card tray 161 has advanced into the card insertion space in this manner, the bottom end of the side panel portion 164 and the front panel portion 165 are above the bottom face 111a of the card 101; that is, positioned near to the top panel portion 62 of the shell 61. As a result, the bottom end of the side panel portion 164 and front panel portion 165 do not abut the bottom wall portion 11b of the housing 11. As a result, the components on the bottom wall portion 11b are not damaged.

Figure 12:
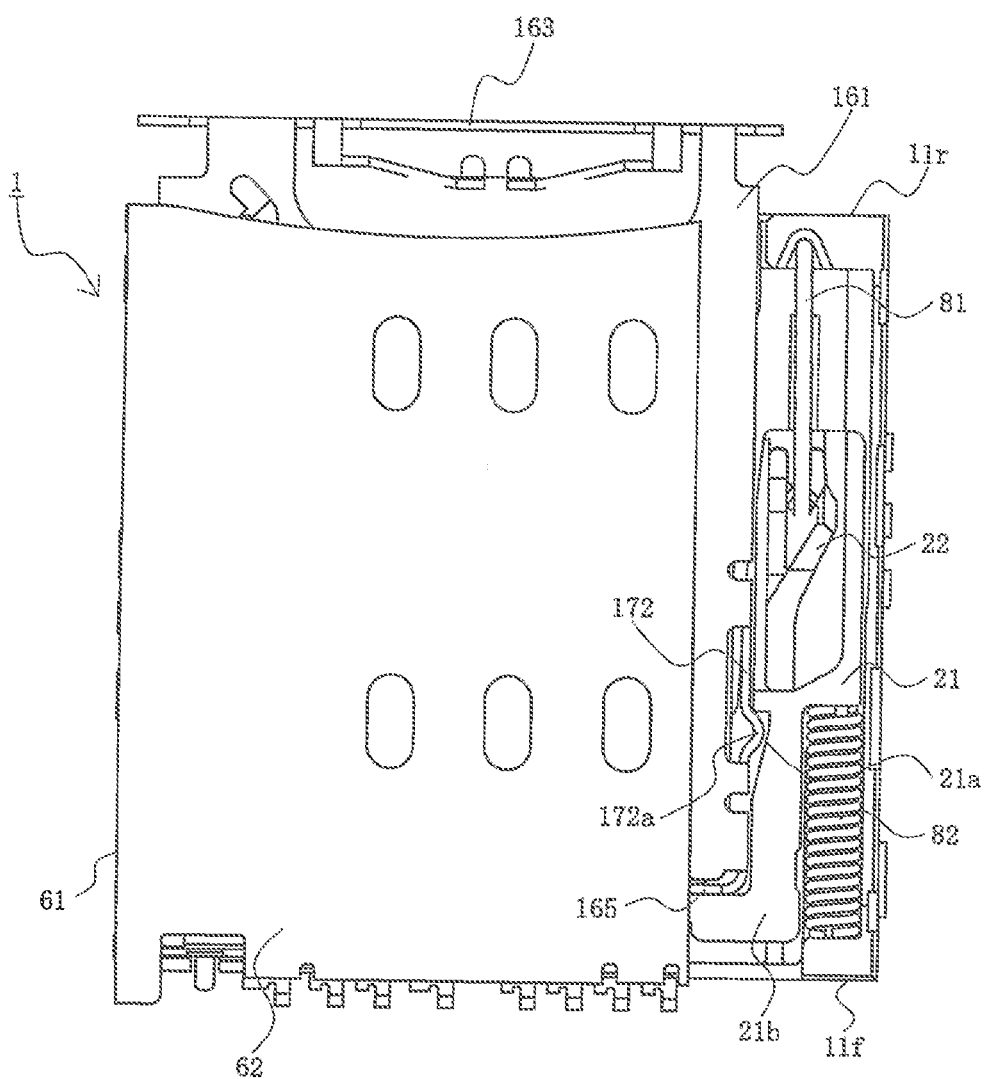
FIG. 12 shows a second planar view showing the operation when a card tray is inserted into a card connector.

When the user stops pushing the card tray 161 and releases the pressure on the card tray 161, the rebounding force of the biasing member 82 moves the sliding member 21 and the card tray 161 to the rear away from the front end 1F of the card connector 1. As shown in FIGS. 10(b) and 12, the sliding member 21 and the card tray 161 stop at the locking position where the card tray 161 is held inside the card connector 1 in a locked state. The free end of the pin member 81 engaging the cam groove 22 formed in the upper face of the sliding member 21 is locked in a portion of the cam groove 22 and stops the movement of the sliding member 21, thereby stopping the sliding member 21 in the locked position.

The card 101 accommodated inside the card tray 161, held along with the card tray 161 in the locked position, can then exchange data with the computing means inside the electronic device encompassing the card connector 1. When the card 101 is held in the locked position, the contact portions 51c of the terminals 51 on the card connector 1 establish contact with the contact pads 151 on the card 101. The abutting portion 57*c* of the first contact member 57 of the card detecting switch is pushed forward and displaced by the front end 111*f* of the card 101, and the main portion 57*b* is separated from the contact portion 58*b* of the second contact member 58. When the first contact member 57 and the second contact member 58 are no longer in contact, the card detecting switch is turned off, and the card 101 is determined to be in the predetermined position inside the card connector 1; that is, in the position where the contact pads 151 and terminals 51 are in contact with each other.

As the card 101 accommodated inside the card tray 161 is biased by the spring action of the elastic arm portion 166, the front end 111*f* applies pressure to the front panel portion 165. Thus, the position of the front panel portion 165 of the card tray 161 is used as a reference position for the proper positioning of the front end 111*f* of the card 101. As the card detecting switch performs the detecting operation when the abutting portion 57*c* of the first contact member 57 comes into direct contact with the front end 111*f* of a properly positioned card 101, the card detecting switch performs the detection operation properly, and the card 101 is properly detected at the position where the contact pads 151 and the terminals 51 contact each other.

When a card connector other than card connector 1 is mounted in an electronic device, the user may not use card connector 1. At this time, a card tray 161 not containing a card 101, that is, an empty card tray 161, may be inserted into the card connector 1 for storage. When a card tray 161 not containing a card 101 is inserted, a notch portion 165*a* is formed in the portion of the front panel portion 165 of the card tray 165 corresponding to the abutting portion 57*c* of the first contact member 57. Because there is no front panel portion 165, the abutting portion 57*c* does not come into contact with any portion of the card tray 161. As a result, the card detecting switch does not detect a card 101 reaching the predetermined position. In other words, when a card tray 161 not containing a card 101 is inserted, the insertion of a card 101 is not mistakenly detected. Because the notch portion 165*a* is preferably formed in a portion corresponding to the region including the terminals 51 where the front panel portion 165 does not exist, the front panel portion 165 does not come into contact with terminals 51 and damage the terminals 51 when a card tray 161 not including a card 101 is inserted into the card connector 1.

To eject the card tray 161 from the card connector 1, when the user pushes in the card tray 161, the sliding member 21 and the card tray 161 are moved from the locked position towards the front end 1F. When the user pushes further, the sliding member 21 and the card tray 161 reach the overstroke position, which is the farthest forward position, and enter an overstroke state. When the user stops pushing the card tray 161 and releases the pressure on the card 101, the biasing force of the biasing member 82 moves the sliding member 21 and the card tray 161 to the rear away from the front end 1F in the direction opposite that of the insertion direction. The sliding member 21 and the card tray 161 move to the rear beyond the locking position, and the card tray 161 is ejected from the insertion opening 18.

Figure 13:
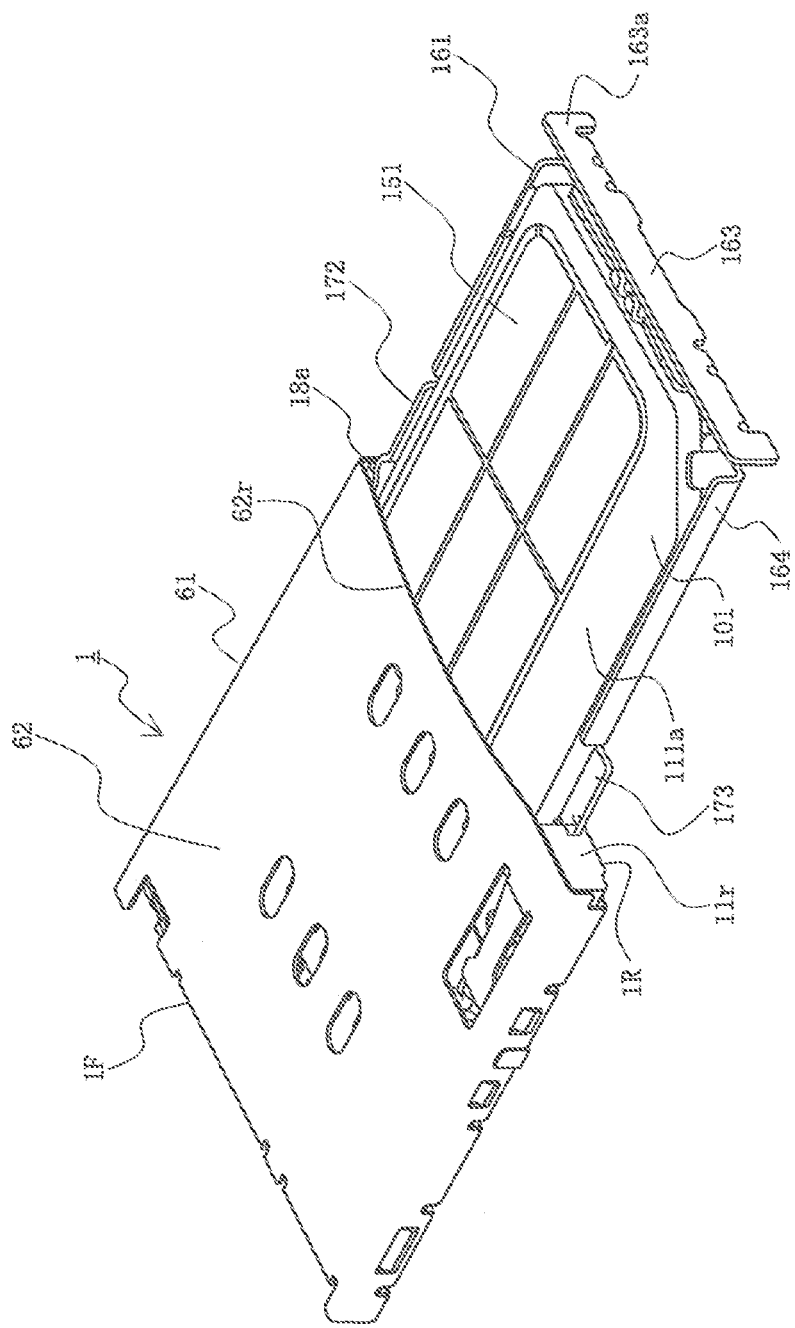
FIG. 13 shows a perspective view showing the operation when a card tray is improperly inserted into a card connector according to an embodiment of the Present Disclosure.
Figure 14:
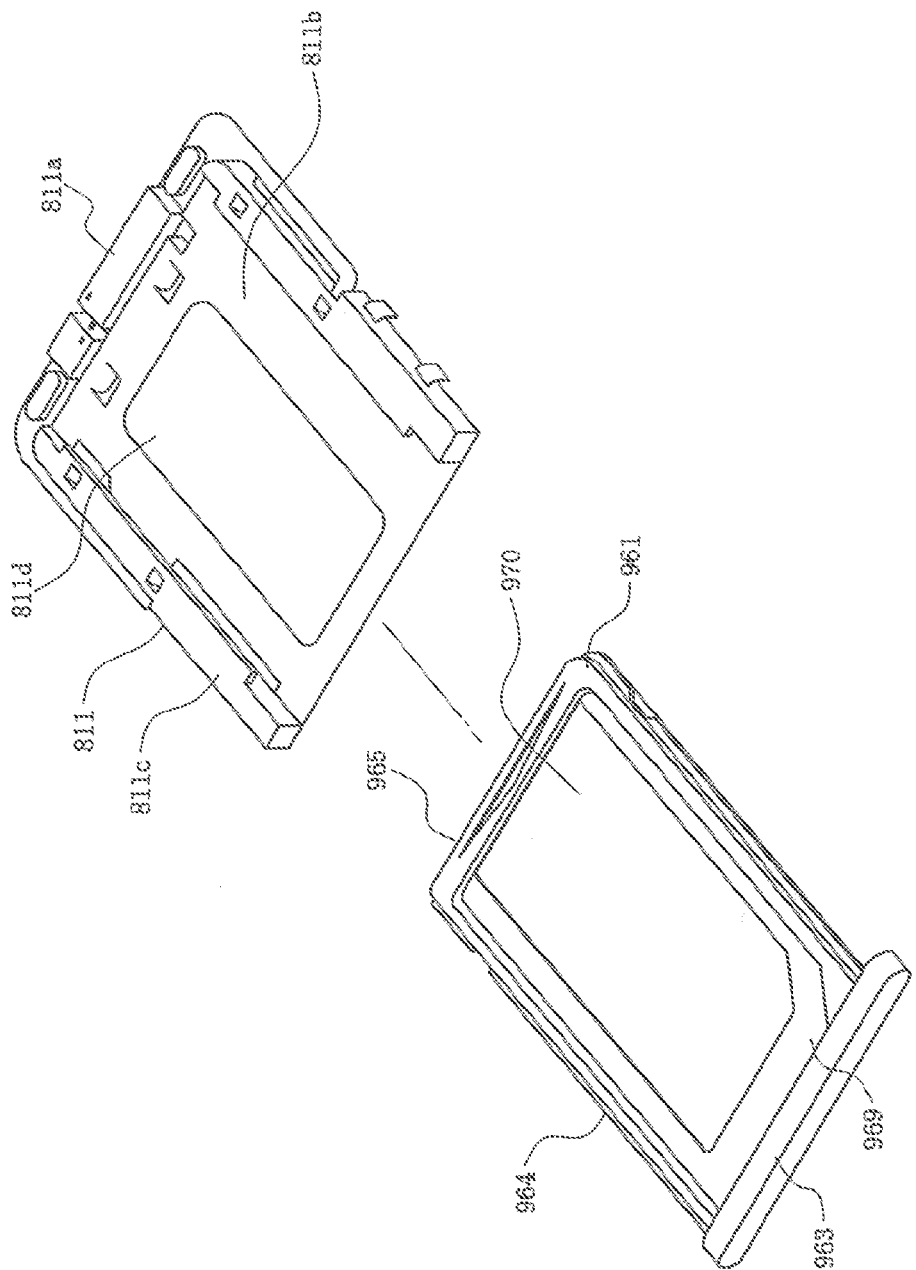
FIG. 14 shows a perspective view of a conventional card connector.

In the first mistaken insertion, as shown in FIG. 13, a card tray 161 is inserted upside down. Here, the card tray 161 is inserted from the insertion opening 18 at the rear of the card connector 1 into the card insertion space formed between the housing 11 and the shell 61 so that the top panel portion 162 is facing downward, that is, facing the bottom wall portion 11*b* of the housing 11, the bottom face 111*a* of the accommodated card 101 is facing the top panel portion 62 of the shell 61, and the front end 161F is facing the front end 1F of the card connector 1.

Because the side panel portion 164 with the engaging portion 172 is positioned on the side of the housing 11 with the insertion allowing slit 18*a*, and the side panel portion 164 with the protruding piece 173 is positioned on the side of the housing 11 with the tray guiding mechanism accommodating portion 11*g*, the protruding piece 173 cannot be inserted into the insertion allowing slit 18*a*, and does not abut the rear end portion 11*r* of the housing 11. As a result, the mistaken insertion of an upside down card tray 161 is reliably prevented.

Also, when a card tray 161 is mistakenly inserted, it is inserted from the insertion opening 18 at the rear of the card connector 1 into the card insertion space formed between the housing 11 and the shell 61 with the rear end 161R facing the front end 1F of the card connector 1. But, because the height dimension of the panel end portions 163*a* on the left and right side of the rear panel portion 163 is greater than the thickness dimension of the insertion opening 18, the shell rear end 62*r* and the rear end portion 11*r* of the housing 11 are abutted. As a result, the rear end 161R of the card tray 161 cannot be inserted from the insertion opening 18 into the card insertion space. As a result, the mistaken insertion of a backwards card tray 161 can be prevented.

In the present embodiment, the card tray 161 has a top panel portion 162 facing a card 101 with contact pads 151 on one face on the side opposite that of the contact pads 151, a front panel portion 162 extending upward from the front edge of the top panel portion 162 and facing the front end 111*f* of the card 101, and a rear panel portion 163 extending upward from the rear edge of the top panel portion 162 and facing the rear end 111*r* of the card 101. As a result, the card 101 is accommodated so that the contact pad 151 is exposed. The card tray 161 also has a notch portion 165*a* formed in the front panel portion 165 so that at least a portion of the front end 111*f* of the card 101 is exposed, and an elastic arm portion 166 arranged near the rear panel portion 163, biasing the card 101 forward and applying pressure to the front end 111*f* of the card 101 at a portion of the front panel portion 165 other than the notch portion 165*a*. This grips the card 101 longitudinally, and exposes the entire side of the card 101 with the contact pads 151. In this way, the card tray 161 can reliably hold a card 101 without damaging the internal components of the card connector 1. Because the card tray 161 is compact and has a low profile, the card connector 1 can also be compact and have a low profile.

The portions of the front panel portion 165 other than the notch portion 165*a* are at both sides of the top panel portion 162 in the width direction. As a result, the front end 111*f* of the card 101 applies pressure to the top panel portion 162 on both sides in the width direction, which stabilizes the orientation of the card 101, and the card 101 is prevented from coming out.

The elastic arm portion 166 includes a cantilevered main portion 166*b*, an abutting portion 166*c* connected to the free end of the main portion 166*b* and abutting the rear end 111*r* of the card 101, and a guiding portion 166*d* with a round curved face connected to the abutting portion 166*c*. This allows the card 101 to be stably biased. Because the guiding portion 166*d* allows the rear end 111*r* of the card 101 to slide smoothly, the card 101 can be more conveniently inserted into the card tray 161 from the front end 111*f*, and the card 101 set in the card tray 161.

Recessed grooves 165*e*, 166*e* are formed in the abutting portion 166*c* and in a portion of the front panel portion 165 other than the notch portion 165a. In this way, the card 101 can be reliably prevented from coming out of the card tray 161.

There are also side panel portions 164 extending upward from the side edges of the top panel portion 162 facing the side edges 112 of the card 101, and the height dimension of the front panel portion 165 and the side panel portions 164 is smaller than the thickness dimension of the card 101. As a result, the side panel portions 164 and the front panel portion 165 do not abut the bottom wall portion 11b of the housing 11 of the card connector 1.

The card connector 1 into which the card tray 161 is inserted has a housing 11 for accommodating the card tray 161, terminals 51 mounted on the housing 11 for establishing contact with the contact pads 151 on the card 101, and a shell 61 mounted on the housing 11 and covering at least the housing 11 and a portion of the card tray 161 inserted into the housing 11. In this way, the card 101 can be easily inserted into the card tray 161 to establish reliable contact between the contact pads 151 of the card 101 and the terminals 51.

The card connector 1 into which the card tray 161 is inserted also has a card detecting switch including a cantilevered first contact member 57 whose abutting portion 57c protrudes from the front end portion 11f of the housing 11 towards the rear end portion 11r. When the front end 111f of the card 101 exposed in the notch portion 165a of the card tray 161 inserted into the housing 11 abuts the abutting portion 57c and the abutting portion 57c is displaced towards the front end portion 11f, the card detecting switch determines that a card 101 has reached the position where the contact pads 151 make contact with the terminals 51. In this way, the front end 111f of the card 101 makes direct contact with the abutting portion 57c and does not abut the front end portion 165 of the card tray 161 when a card 101 is accommodated inside the card tray 161. As a result, it can be reliably determined when a card 101 has reached the position where the contact pads 151 make contact with the terminals 51.

The card connector 1 in which the card tray 161 is inserted also has an insertion opening 18 formed between the rear end portion 11r of the housing 11 and the shell rear end portion 62r of the shell 61 into which the card tray 161 is inserted. The insertion opening 18 has an insertion allowing slit 18a formed on one end, and the card tray 161 has a protruding piece 173 protruding from one side edge of the top panel portion 162. The protruding piece 173 can pass through the insertion allowing slit 18a only when the card tray 161 has been properly inserted into the insertion opening 18. Therefore, the card tray 161 cannot be improperly inserted.

Also, the card tray 161 has a panel end portion 163a formed on both ends of the rear panel portion 163, and the height dimension of the panel end portions 163a is greater than the thickness dimension of the insertion opening 18. As a result, the card tray 161 cannot be inserted from the insertion opening 18 with a backwards orientation.

While a preferred embodiment of the Present Disclosure is shown and described, it is envisioned that those skilled in the art may devise various modifications without departing from the spirit and scope of the foregoing Description and the appended Claims.

What is claimed is:

1. A card tray, the card tray comprising:
    a top panel portion, the top panel portion facing the opposite face of a card, the card including terminal members on one face;
    a front panel portion, the front panel portion standing erect at a front edge of the top panel portion and facing a front end of the card:
    a rear panel portion, the rear panel portion standing erect at a rear edge of the top panel portion and facing a rear end of the card;
    a notch portion, the notch portion being formed in the front panel portion and exposing at least a portion of the front end; and
    a card holding spring portion, the card holding spring portion extending from the rear panel portion, biasing the card forward, and applying pressure to the front end at a first portion, the first portion being a portion of the front panel portion other than the notch portion;
    wherein the card may be grasped longitudinally to expose the entire face of the card on the terminal member side.

2. The card tray of claim 1, wherein the first portion is disposed between both ends of the top panel portion in the width direction.

3. The card tray of claim 2, wherein the card holding spring portion includes a cantilevered main portion.

4. The card tray of claim 3, wherein the card holding spring portion further includes an abutting portion, the abutting portion being connected to a free end of the main portion and abutting the rear end.

5. The card tray of claim 4, wherein the card holding spring portion further includes a guiding portion, the guiding portion being connected to the abutting portion and having a round, curved face.

6. The card tray of claim 5, wherein an uneven portion is formed in the abutting portion and the first portion.

7. The card tray of claim 6, further comprising a side panel portion, the side panel portion standing erect at a side edge of the top panel portion and facing an edge of the card, the height dimension of the front panel portion and the side panel portion being smaller than the thickness dimension of the card.

* * * * *